(12) United States Patent
Kim

(10) Patent No.: US 6,914,632 B1
(45) Date of Patent: Jul. 5, 2005

(54) APPARATUS FOR PANNING AND SCALING WINDOW IN IMAGE SENSOR

(75) Inventor: Hyun-Eun Kim, Ichon-shi (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/469,318

(22) Filed: Dec. 22, 1999

(30) Foreign Application Priority Data

Dec. 22, 1998 (KR) ........................................ 1998-57238

(51) Int. Cl.[7] .......................... H04N 3/14; H04N 5/335; G06K 9/54; G06K 9/60
(52) U.S. Cl. ...................................... 348/308; 348/304
(58) Field of Search ................................ 348/281, 283, 348/321, 323, 302, 240.2

(56) References Cited

U.S. PATENT DOCUMENTS

| | | | | |
|---|---|---|---|---|
| 4,539,598 A | * | 9/1985 | Dietrich et al. ............. | 348/319 |
| 4,750,042 A | * | 6/1988 | Murayama et al. ......... | 348/323 |
| 4,858,020 A | * | 8/1989 | Homma ....................... | 358/451 |
| 5,452,004 A | * | 9/1995 | Roberts ....................... | 348/301 |
| 6,512,858 B2 | * | 1/2003 | Lyon et al. ................. | 382/305 |
| 2002/0101528 A1 | * | 8/2002 | Lee et al. .................... | 348/304 |

FOREIGN PATENT DOCUMENTS

| | | | | |
|---|---|---|---|---|
| KR | | 9417871 | 12/1992 | ............ H04N/7/13 |

* cited by examiner

*Primary Examiner*—Andrew Christensen
*Assistant Examiner*—Gary L Solomon
(74) *Attorney, Agent, or Firm*—Piper Rudnick LLP

(57) ABSTRACT

An apparatus for panning and scaling a window in CMOS image sensor is described. The apparatus comprises a pixel array having a plurality of unit pixels, a row driving part, an analog-digital converting part, an address generating part for generating a row address and a column address for the panning and scaling, and a line buffering part for receiving the digital pixel data outputted from the analog-digital converting part and outputting a pixel data according to the column address. According to the apparatus, CMOS image sensor can directly extract a pixel data of a desired resolution and scale offset.

11 Claims, 6 Drawing Sheets

APPARATUS FOR PANNING AND SCALING WINDOW IN IMAGE SENSOR

BACKGROUND OF THE INVENTION

The present invention relates to an image sensor, more particularly, to an apparatus for panning a particular window of a full window and for scaling a window in reading sensing data in an image sensor.

In general, an image sensor is an apparatus for capturing image by using a light sensitive characteristic of a semiconductor and consisted of from hundreds to millions of pixels, in which each unit pixel comprises a light sensitive device. The device converts a photon to an electron-hole pair to store charge. The quantity of charge depends to light strength and light illuminating time. After that, an image sensor observes the charge and converts the pixel data of light to electric data.

FIG. 1 is a block diagram of a prior CCD (charge Coupled Device) image sensor.

As shown the FIG. 1, the CCD image sensor converts the image data of light outputted from a pixel array 100 consisted of a plurality of unit pixels to electric data. Thus, the CCD image sensor cannot selectively read a particular portion of a full window because of transferring charge as such. Namely, the image sensor vertically transfers charge a unit of a row of the pixel array 100 and moves the row to an analog shift register 110. Then, the image sensor horizontally transfers the row and outputs it as a pixel data.

Accordingly, since such CCD image sensor must read all the frames in even of intending to read a particular portion of frame, it wastes a time on reading operation.

FIG. 2 is a block diagram of a prior CMOS image sensor consisted of an active pixel array.

As shown the FIG. 2, the CMOS image sensor involves a row driver 210 capable of selectively driving a row of a desired pixel array 200 and reading a pixel data via a row address generator (unshown). The pixel data of the row is transferred to a shift register 220 and is outputted as a pixel data after horizontally and serially shifted from the shift register 220.

The shift register 220 may store and shift analog pixel data or digital pixel data converted from pixel data of the row selected before the shift register 220. In the former case, it is needed to convert analog pixel data outputted from the shift register 220 to digital pixel data in the following process.

Accordingly, while the CCD image sensor like FIG. 2 can selectively a row of pixel array because of serially output of pixel data of a row read, it cannot selectively read a column of pixel array.

SUMMARY OF THE INVENTION

The object of the present invention is to provide an apparatus for panning and scaling a window in an image sensor capable of implementing a panning and a scaling operation of window easily by selectively reading a row and a column of pixel array.

To accomplish the objects, the present invention provides an apparatus for panning and scaling a window in CMOS image sensor having a pixel array consisted of a plurality of unit pixels and a row driving part for driving a row of the pixel array according to a row address, the apparatus comprising: an address generating part for generating a row address and a column address for panning and scaling, wherein the row address for panning and scaling is sum of a row start address, window height for panning, and a scaling offset and the column address for panning and scaling is sum of a column start address, window width for panning, and a scaling offset; an analog-digital converting part for receiving the analog pixel data of the row selected by the row driving part and converting it to digital pixel data; and a line buffering part for receiving the digital pixel data outputted from the analog-digital converting part and outputting pixel data according to the column address.

The apparatus according to the present invention comprises an addressable line buffering part storing a digital pixel data instead of a prior shift resister. Since the apparatus can access a desired column of the digital pixel data stored in the line buffering part by using a column address, it can control the pixel data in a row and a column and implement a panning and a scaling operations more easily. Particularly, in the present invention, reading a predetermined period in the line buffering part by a column address after reading a continuous row of a desired period may perform a panning operation. And, in case of scaling operation, adding an offset to a row and a column in generating a row and a column is performed instead of reading a continuous row. Also, the present invention may perform a panning and a scaling operation at the same time by simultaneously employing a window period for panning and a scaling offset for scaling.

The line buffering part according to the present invention comprises two line buffers, because writing operation for writing a pixel data of a row and reading operation for reading a line buffer must be performed at the same time. The line buffering part can perform writing a row data in one line buffer with reading a pixel data stored in the other line buffer.

BRIEF DESCRIPTION OF THE DRAWING

The object, features and advantages of the present invention are understood within the context of the description of the preferred embodiment as set forth below. The description of the preferred embodiment is understood within the context of accompanying drawing. Which form a material part of this disclosure, wherein.

DESCRIPTION OF THE PREFERRED EMBODIMENT

The description of the preferred embodiment as set forth below.

Figure 1:
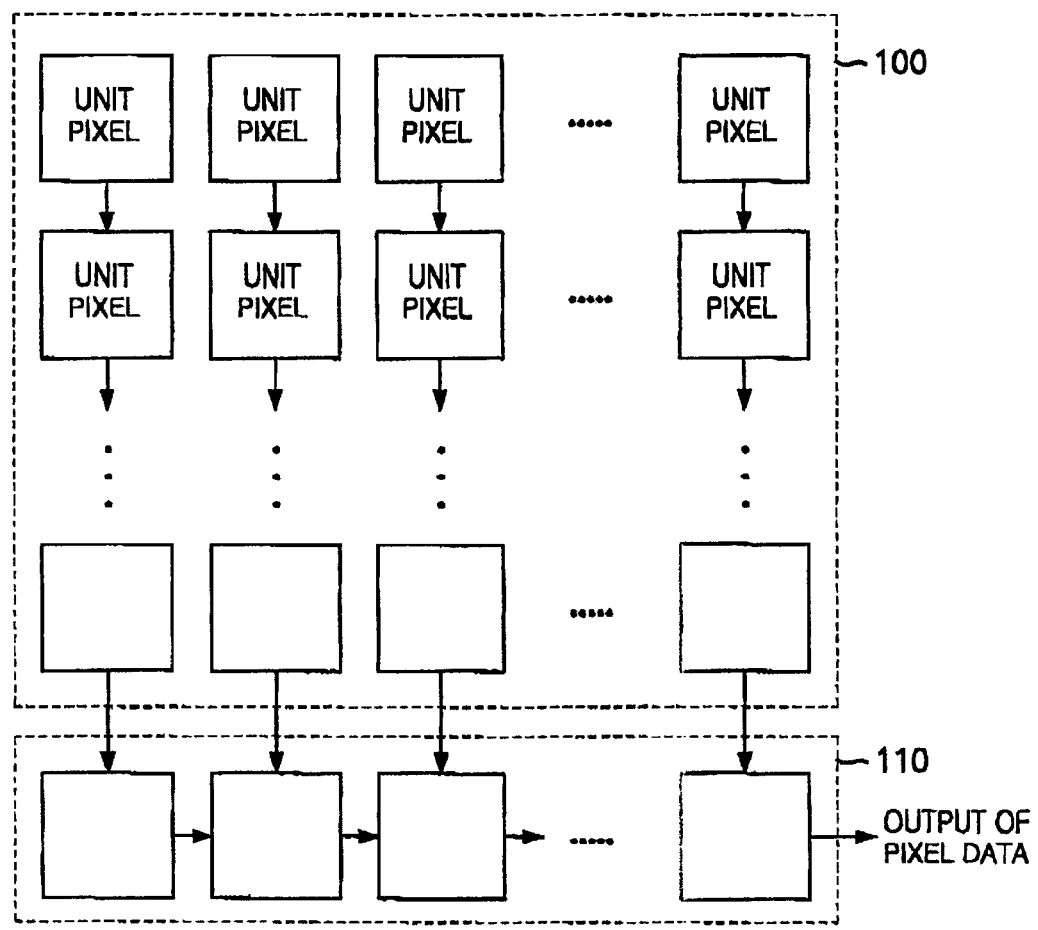
FIG. 1 is a block diagram depicting a prior CCD (Charge Coupled Device) image sensor.
Figure 2:
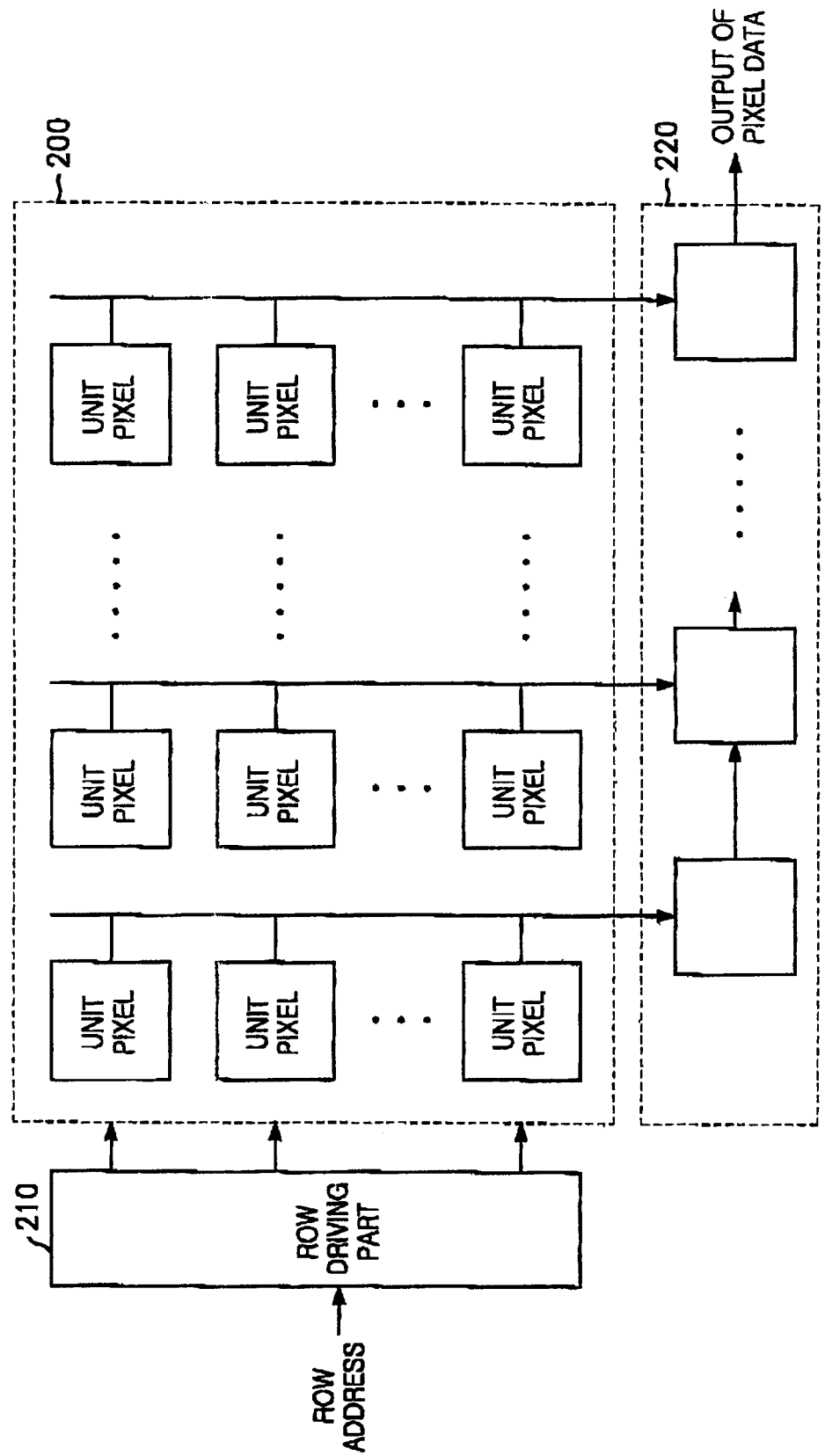
FIG. 2 is a block diagram depicting a prior CMOS image sensor involving an active pixel array.
Figure 3:
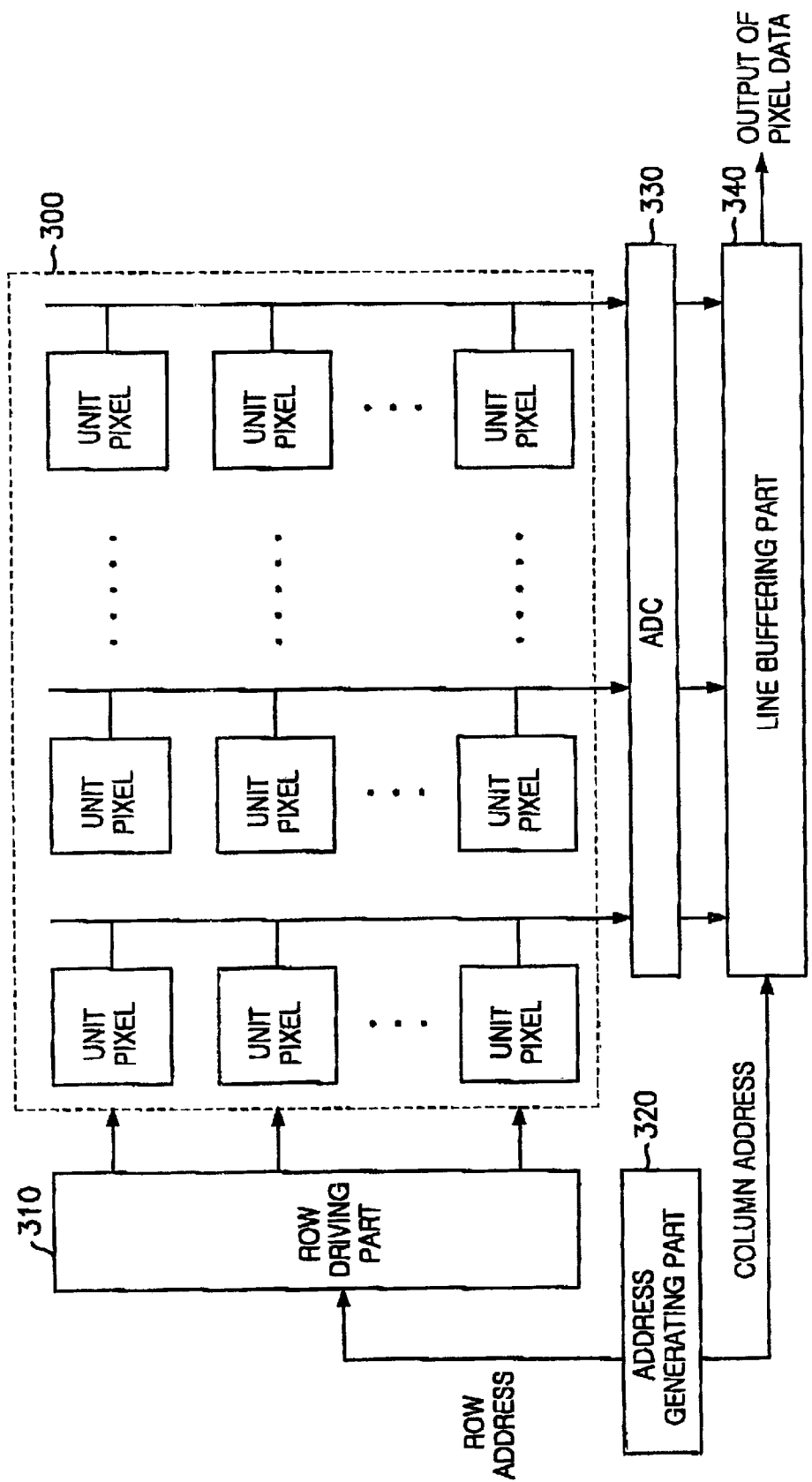
FIG. 3 is a block diagram depicting a CMOS image sensor involving a pixel array according to the present invention.

FIG. 3 is a block diagram depicting a CMOS image sensor involving a pixel array according to the present invention.

As described FIG. 3, the apparatus according to the present invention comprises: a pixel array 300 consisted of a plurality of unit pixels; a row driving part 310 for driving the row of the pixel array according to a row address; an analog-digital converting part (ADC) 330 for converting the analog pixel data of the selected row to a digital pixel data; an addressable line buffering part 340 for outputting a desired pixel data of the digital pixel data according to a column address; and an address generating part 320 for generating the row address and the column address.

Figure 4:
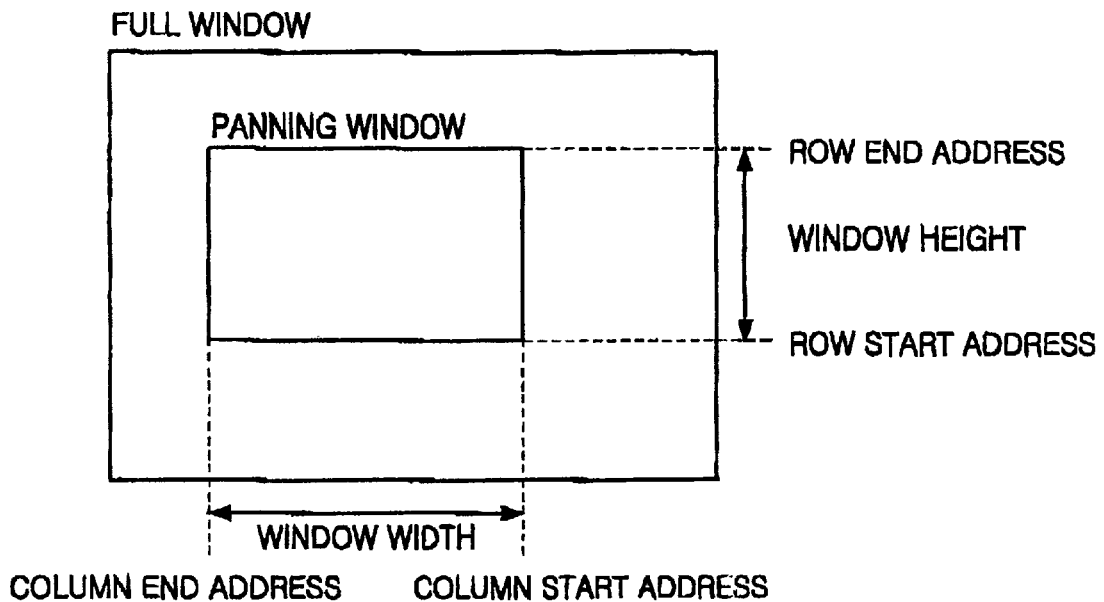
FIG. 4 is a diagram illustrating a panning window program for panning operation.

FIG. 4 is a diagram illustrating a panning window program for panning operation. Panning operation may be defined that an image sensor selectively reads data of a particular window in a full window. A panning window may be programmed with a row start address, a column start address, a window width, and a window height, and it may be generated by the address generating part 320 like the following description.

The address generating part 320 generates a row address by using the row start address and the panning window height. It increases the start row address by "1" until a row end address (row address+window height). If a row address becomes to the row end address, the address generating part 320 makes it back to the row start address. Also, the address generating part 320 generates a column address by using the column start address and the window width. At that time, the column address indicates a line buffer address. The address generating part 320, like generating a row, increases the start column address by "1" until a column end address (column address+window height). If a column address becomes to the column end address, the address generating part 320 makes it back to the column start address.

And, the row driving part 310 drives a row of the pixel array 300 according to the generated row address, and then the driven pixel data is stored in the line buffering part 340 via the ADC 330.

Figure 5:
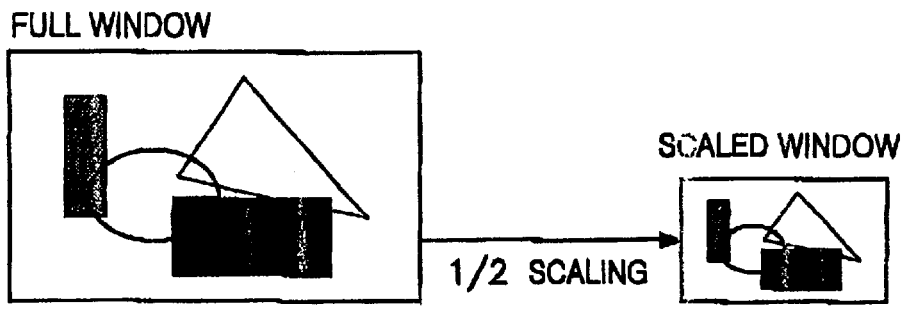
FIG. 5 is a diagram illustrating a ½-scaled window of full window.

FIG. 5 is a diagram illustrating a ½-scaled window of full window.

While a panning operation does not affect magnification of an object, a scaling operation affects a size of pixel by scaling offset. The scaling offset of n makes the size of full pixel a 1/n scaled size. For example, when the size of full pixel array of an image sensor is 400×300, the size of full pixel is decreased to ½ of the original size, 200×150, by a scaling operation. The address generating part 320 increases a row and a column address by a scaling offset to generate a row and a column address.

Further, simultaneously employing the panning and the scaling operations may scale pixel data of a desired window as much as desired.

Figure 6:
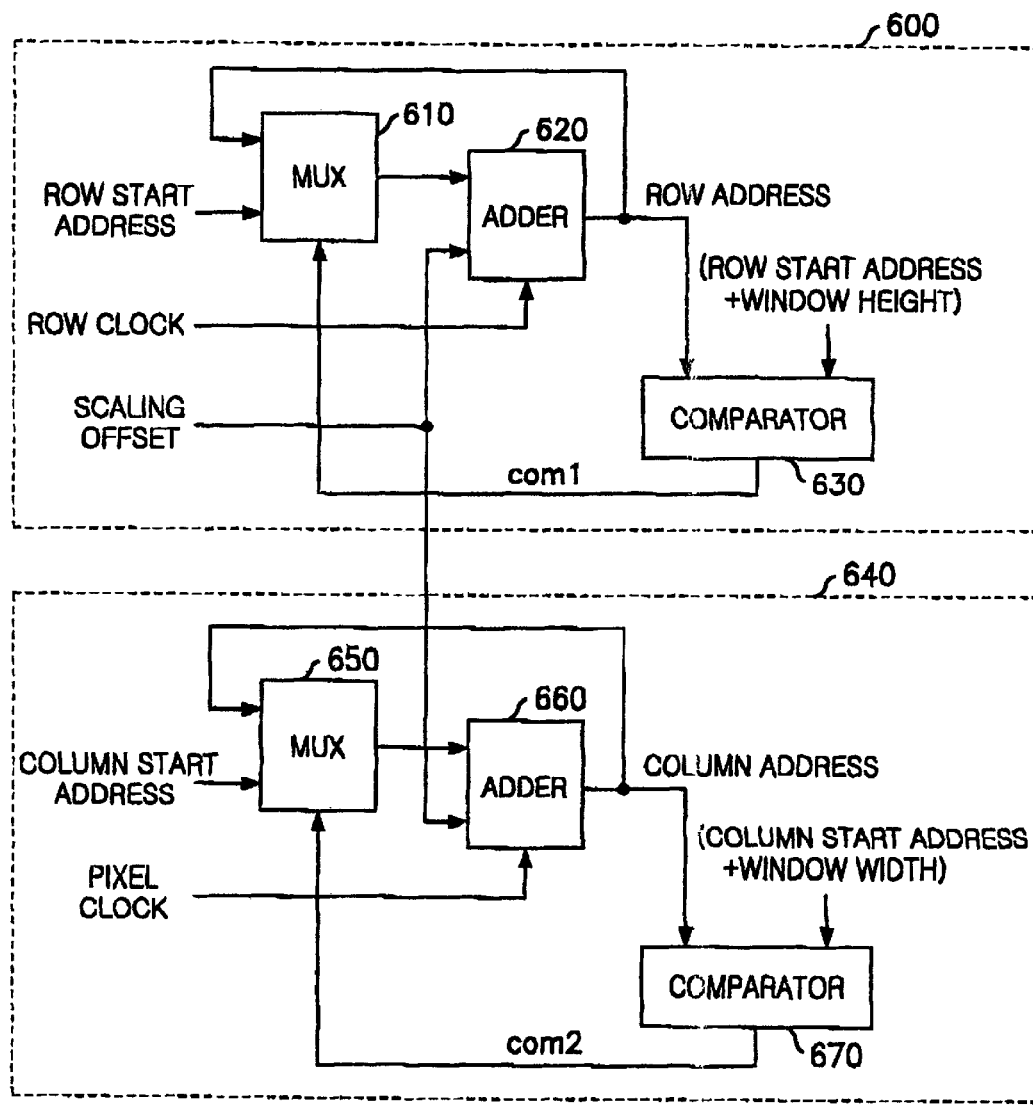
FIG. 6 is a block diagram depicting an address generating part according to an embodiment of the present invention.

FIG. 6 depicts an address generating part 320 according to an embodiment of the present invention, when a panning and a scaling operation are employed at the same time. The address generating part 320 comprises a row address generator 600 and a column address generator 640.

The row address generator 600 comprises multiplexer (MUX) 610, adder 620 and comparator 630, and receives a row start address, a window height, a scaling offset and row clock. The row address generator 600 starts with a row start address and adds a scaling offset to the row address to generate a new row address according to a row clock. At that time, when the scaling offset is "1", because the row address is increased by "1", the result scaling operation equals to no operation. Since the row address has not to be higher than the row end address, the comparator 630 compares the generated row address with the row end address (row start address+window height) to determine whether the generated row address is higher than the row end address or not. If the row address is higher than the row end address, a row addresses generator 600 goes to the row start address.

In the row address generator 600, the adder 620 adds the scaling offset to a row address according to the row clock and outputs it to the MUX 610 and comparator 630. The comparator 630 compares a row end address (the row start address+the window height) with the row address inputted from the adder 620 to determine whether the row address of the adder 620 is higher than a row address for panning. Then the comparator 630 outputs a resulting comparison signal (com1) to the MUX 610. The MUX 610 selects and outputs either the row start address or the row address feedback inputted from an adder 620 according to a comparison signal (com1). Particularly, if the comparison signal (com1) indicates the row address of the adder 620 is smaller than the row end address, the MUX 610 selects the row address feedback inputted from the adder 620. If the comparison signal (com1) indicates that the row address of the adder 620 is higher than the row end address, the MUX 610 selects the row start address.

As the row address generator 600, the column address generator 640 also comprises MUX 650, adder 660 and comparator 670, and receives a column start address, a window width, a scaling offset and pixel clock. The column address generator 640 starts with a column start address and adds a scaling offset to the column address to generate a new column address according to pixel clock. At that time, when the scaling offset is "1", because the row address is increased by "1", the result scaling operation equals to no operation. Since the column address has not to be higher than the column end address, the comparator 670 compares the generated column address with the column end address (column start address+window width) to determine whether the generated row address is higher than the row end address or not. If the column address is higher than the column end address, a column addresses generator 640 goes to the column start address.

Also, in the column address generator 640, the adder 660 adds the scaling offset to a column address according to the pixel clock and outputs it to the MUX 650 and comparator 670. The comparator 670 compares a column end address (the column start address+the window width) with the column address inputted from the adder 660 to determine whether the column address of the adder 660 is higher than a column address for panning. Then the comparator 670 outputs a resulting comparison signal (com2) to the MUX 650. The MUX 650 selects and outputs either the column start address or the column address feedback inputted from an adder 660 according to a comparison signal (com2). Particularly, if the comparison signal (com2) indicates the column address of the adder 660 is smaller than the row end address, the MUX 650 selects the column address feedback inputted from the adder 660. If the comparison signal (com2) indicates that the column address of the adder 660 is higher than the column end address, the MUX 650 selects the column start address.

Figure 7:
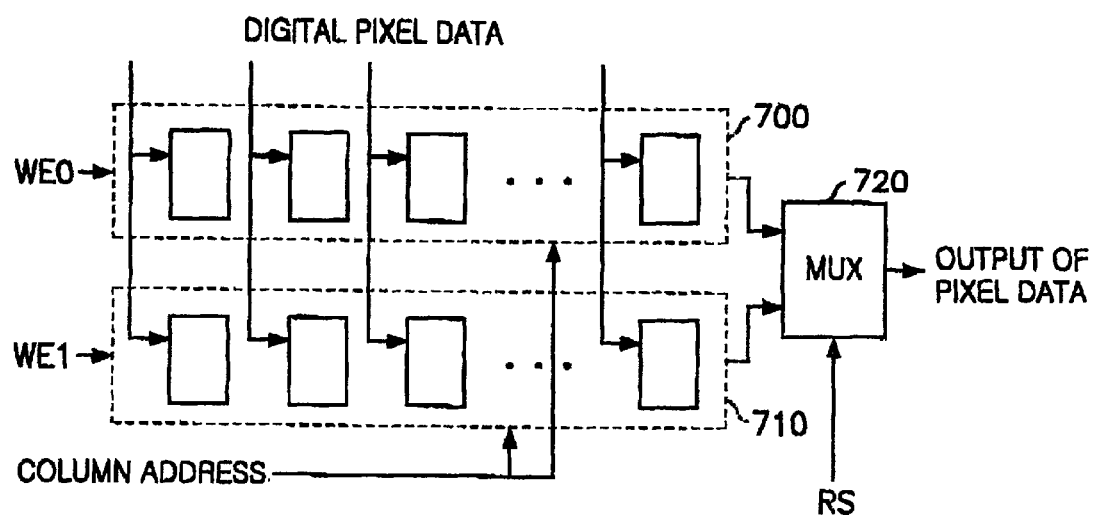
FIG. 7 is a block diagram depicting a line buffering part according to an embodiment of the present invention.

FIG. 7 is a block diagram depicting a line buffering part 340 according to an embodiment of the present invention. The line buffering part 340 comprises a pair of buffers 700, 710 and MUX 720 to extract a image frame continuously.

In the line buffering part 340, the digital pixel data outputted from the ADC 330 may be written to the first line buffer 700 or the second line buffer 710 according to an enable signals WE0 and WE1. Then, the MUX 720 selects and output pixel data from disable one of the first and the second line buffer 700, 710. At that time, the MUX 720 is enabled by a read enable signal (RS). Since the column address is commonly connected to the first and the second line buffer 700, 710, one of the line buffers 700, 710 can perform reading operation even if the other is performing writing operation.

Figure 8:
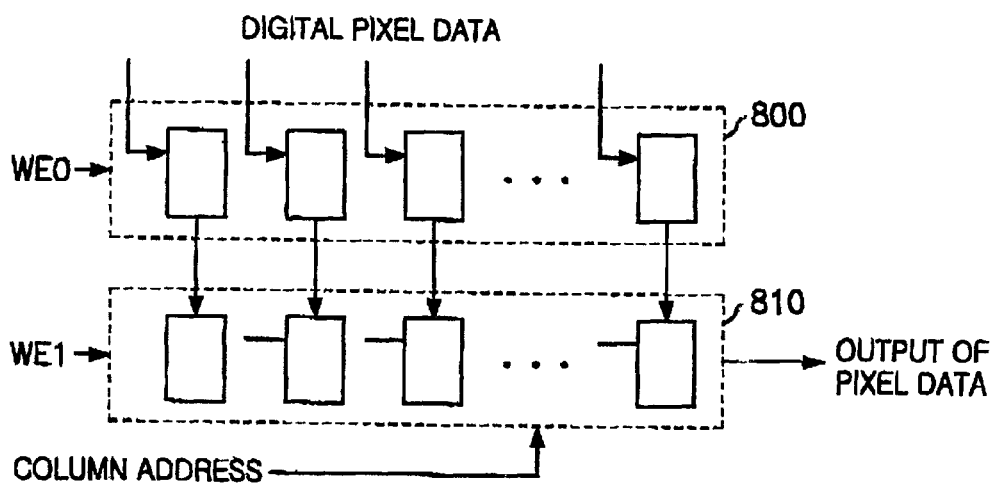
FIG. 8 is a block diagram depicting another line buffering part according to another embodiment of the present invention.

FIG. 8 is a block diagram depicting another line buffering part 340 according to another embodiment of the present invention. In this embodiment, the line buffering part 340 comprises a write line buffer 800 and a read line buffer 810. A digital pixel data outputted from the ADC 330 is first stored to the write line buffer 800 according to a write enable signal WE0, then the digital data is stored to the read line buffer 810 according to a write enable signal WE1. After that the digital data is outputted as a pixel data according to a column address. In this line buffering part 340, there are advantages that the column address controls only a read line buffer 810 and MUX is not needed for outputting a pixel data.

According to the present invention, since a row and a column address are generated by an address generating part to pan and scale a window in CMOS image sensor, the apparatus can directly extract a pixel data of a desired resolution and scaling offset without further processing. Also, the apparatus according to the present invention can operate window easily without applying another load to a host system Although a preferred embodiment of the present invention has been illustrated and described, various alternatives, modifications and equivalents may be used. Therefore, the foregoing description should not be taken as limiting the scope of the present invention, which is defined by the appended claims.

What is claimed is:

1. An apparatus for panning a window in CMOS image sensor having a pixel array consisted of a plurality of unit pixels and a row driving part for driving a row of the pixel array according to a row address, the apparatus comprising:

an address generating part for generating a row address and a column address for panning, wherein the row address for panning is sum of a row start address and window height for panning and the column address for panning is sum of a column start address and window width for panning;

an analog-digital converting part for receiving analog pixel data of the row selected by the row driving part and converting the analog pixel data to digital pixel data; and a line buffering part for receiving the digital pixel data outputted from the analog-digital converting part and selectively outputting one among the digital pixel data according to the column address, wherein the line buffering part includes:

a first line buffer for storing digital pixel data outputted from the analog-digital converting part according to a first write enable signal;

a second line buffer for storing digital pixel data outputted from the analog-digital converting part according to second write enable signal; and a third selector enabled by a read enable signal for selecting and outputting the pixel data stored in the first or the second line buffer according to the column address commonly connected to both the first and the second line buffers.

2. An apparatus in accordance with claim 1, the address generating part comprises a row address generating part, the row address generator comprises:

a first adder for increasing a row address according to row clock;

a first comparator for receiving the row address from the first adder, comparing the row address with the row address for panning, and outputting a first comparison signal; and a first selector for receiving the first comparison signal from the first comparator, selecting the row start address and outputting it to the first adder if the first comparison signal indicates that the row address from the first adder is higher than the row address for panning, otherwise, selecting the row address feedback inputted from the first adder and outputting it to the first adder.

3. An apparatus in accordance with claim 1, the address generating part comprises a column address generating part, the column address generator comprises:

a second adder for increasing a column address according to pixel clock;

a second comparator for receiving the column address from the second adder, comparing the column address with the column address for panning, and outputting a second comparison signal; and a second selector for receiving the second comparison signal from the second comparator, selecting the column start address and outputting it to the second adder if the second comparison signal indicates that the column address from the second adder is higher than the column address for panning, otherwise, selecting the column address feedback inputted from the second adder and outputting it to the second adder.

4. An apparatus in accordance with claim 1, the line buffering part comprising:

a write line buffer for storing digital pixel data outputted from the analog-digital converting part according to first write enable signal; and a read line buffer for storing pixel data outputted from the write line buffer according to second write enable signal, and selectively outputting the stored pixel data according to the column address.

5. An apparatus for scaling a window in CMOS image sensor having a pixel array consisted of a plurality of unit pixels and a row driving part for driving a row of the pixel array according to a row address, the apparatus comprising:

an address generating part for generating a row address and a column address for scaling;

an analog-digital converting part for receiving analog pixel data of the row selected by the row driving part and converting the analog pixel data to digital pixel data; and a line buffering part for receiving the digital pixel data outputted from the analog-digital converting part and selectively outputting one among the digital pixel data according to the column address, wherein the line buffering part includes:

a first line buffer for storing digital pixel data outputted from the analog-digital converting part according to first write enable signal;

a second line buffer for storing digital pixel data outputted from the analog-digital converting part according to second write enable signal; and a third selector enabled by a read enable signal for selecting and outputting the pixel data stored in the first or the second line buffer according to the column address commonly connected to both the first and the second line buffers.

6. An apparatus in accordance with claim 5, the address generating part comprises:
   a row address generating part for generating the row address for scaling by adding a scaling offset to a row address; and
   a column address generating part for generating the column address for scaling by adding a scaling offset to a row address.

7. An apparatus in accordance with claim 5, the line buffering part comprising:
   a write line buffer for storing digital pixel data outputted from the analog-digital converting part according to first write enable signal; and
   a read line buffer for storing pixel data outputted from the write line buffer according to second write enable signal, and selectively outputting the stored pixel data according to the column address.

8. An apparatus for panning and scaling a window in CMOS image sensor having a pixel array consisted of a plurality of unit pixels and a row driving part for driving a row of the pixel array according to a row address, the apparatus comprising:
   an address generating part for generating a row address and a column address for panning and scaling, wherein the row address for panning and scaling is sum of a row start address, window height for panning, and a scaling offset and the column address for panning and scaling is sum of a column start address, window width for panning, and a scaling offset;
   an analog-digital converting part for receiving analog pixel data of the row selected by the row driving part and converting the analog pixel data to digital pixel data; and
   a line buffering part for receiving the digital pixel data outputted from the analog-digital converting part and selectively outputting one among the digital pixel data according to the column address, wherein the line buffering part includes:
     a first line buffer for storing digital pixel data outputted from the analog-digital converting part according to first write enable signal;
     a second line buffer for storing digital pixel data outputted from the analog-digital converting part according to second write enable signal; and
     a third selector enabled by a read enable signal for selecting and outputting the pixel data stored in the first or the second line buffer according to the column address commonly connected to both the first and the second line buffers.

9. An apparatus in accordance with claim 8, the address generating part comprises a row address generating part, the row address generator comprises:
   a first adder for increasing a row address according to row clock;
   a first comparator for receiving the row address from the first adder, comparing the row address with the row address for panning and scaling, and outputting a first comparison signal; and
   a first selector for receiving the first comparison signal from the first comparator, selecting the row start address and outputting it to the first adder if the first comparison signal indicates that the row address from the first adder is higher than the row address for panning and scaling, otherwise, selecting the row address feedback inputted from the first adder and outputting it to the first adder.

10. An apparatus in accordance with claim 6, the address generating part comprises a column address generating part, the column address generator comprises:
   a second adder for increasing a column address according to pixel clock;
   a second comparator for receiving the column address from the second adder, comparing the column address with the column address for panning and scaling, and outputting a second comparison signal; and
   a second selector for receiving the second comparison signal from the second comparator, selecting the column start address and outputting it to the second adder if the second comparison signal indicates that the column address from the second adder is higher than the column address for panning and scaling, otherwise, selecting the column address feedback inputted from the second adder and outputting it to the second adder.

11. An apparatus in accordance with claim 8, the line buffering part comprising:
   a write line buffer for storing digital pixel data outputted from the analog-digital converting part according to first write enable signal; and
   a read line buffer for storing pixel data outputted from the write line buffer according to second write enable signal, and selectively outputting the stored pixel data according to the column address.

\* \* \* \* \*